United States Patent
Cosco et al.

(10) Patent No.: US 11,574,271 B2
(45) Date of Patent: Feb. 7, 2023

(54) METHOD AND SYSTEM FOR ASSESSING PLAY VALUE OF A PLAYGROUND

(71) Applicants: Nilda Cosco, Raleigh, NC (US);
Muntazar Monsur, Raleigh, NC (US);
Robin C. Moore, Raleigh, NC (US);
Linda Hestenes, Greensboro, NC (US);
Jennie Sumrell, Chattanooga, TN (US);
Lisa Moore, Chattanooga, TN (US)

(72) Inventors: Nilda Cosco, Raleigh, NC (US);
Muntazar Monsur, Raleigh, NC (US);
Robin C. Moore, Raleigh, NC (US);
Linda Hestenes, Greensboro, NC (US);
Jennie Sumrell, Chattanooga, TN (US);
Lisa Moore, Chattanooga, TN (US)

(73) Assignees: PLAYCORE WISCONSIN, INC., Chattanooga, TN (US); NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 17/466,905

(22) Filed: Sep. 3, 2021

(65) Prior Publication Data
US 2022/0237539 A1 Jul. 28, 2022

Related U.S. Application Data

(63) Continuation of application No. 15/400,723, filed on Jan. 6, 2017, now Pat. No. 11,113,651.
(Continued)

(51) Int. Cl.
*G06Q 30/00* (2012.01)
*G06Q 10/06* (2012.01)
*A63G 31/00* (2006.01)

(52) U.S. Cl.
CPC ......... *G06Q 10/0637* (2013.01); *A63G 31/00* (2013.01)

(58) Field of Classification Search
CPC ...... G06Q 10/0637; A63B 17/00; A63B 4/00; A63G 13/00; A63G 21/00; A63G 31/00; A63G 9/00; A63G 9/14
See application file for complete search history.

(56) References Cited

U.S. PATENT DOCUMENTS

| | | | | |
|---|---|---|---|---|
| 4,856,318 A | * | 8/1989 | Hogan | G01N 3/48 73/492 |
| 7,029,400 B2 | * | 4/2006 | Briggs | A63G 31/007 472/137 |

(Continued)

OTHER PUBLICATIONS

Dunnett, et al. Improving Urban Parks, Play Areas and Green Spaces Department of Landscape, University of Sheffield, Department for Transport, Local Government and the Regions: London; May 2002 (Year: 2002).*

*Primary Examiner* — Patricia H Munson
*Assistant Examiner* — Uche Byrd
(74) *Attorney, Agent, or Firm* — McAndrews, Held & Malloy, Ltd.

(57) ABSTRACT

The present invention provides methods and systems for determining the play value of a playground, the challenge level of a playground, or both. In some embodiments, the methods and systems may propose modifications to a playground that would result in an effective and efficient increase in the play value of the playground, a desired increase or decrease in the challenge level of the playground, or both. Further, in some embodiments, the methods and systems may be configured to provide comparisons of various playgrounds in order to determine which playgrounds are of greatest play value. In some embodiments, the methods and (Continued)

systems may be incorporated into software that is configured for the design of playgrounds.

20 Claims, 18 Drawing Sheets

Related U.S. Application Data

(60) Provisional application No. 62/275,942, filed on Jan. 7, 2016.

(56) References Cited

U.S. PATENT DOCUMENTS

| | | | | |
|---|---|---|---|---|
| 8,226,493 B2 * | 7/2012 | Briggs | ............... | A63G 3/00 |
| | | | | 472/133 |
| 2011/0300522 A1 * | 12/2011 | Faubert | ............... | H04N 13/363 |
| | | | | 434/236 |
| 2013/0183647 A1 * | 7/2013 | Miller | ............... | G06Q 10/00 |
| | | | | 434/247 |

\* cited by examiner

FIG. 1

| Climbing component 1: Challenge Indicator 1: Distance between risers | | | |
|---|---|---|---|
| | Continuous surface | Risers @ regular distance | Risers @ irregular distance; no risers available |
| Distance between risers | ⦿ | ○ | ○ |
| Challenge Indicator 2: Inclination | | | |
| | Light inclination | Moderate inclination | Sharp inclination or vertical |
| Inclination | ⦿ | ○ | ○ |
| Challenge Indicator 3: Direction | | | |
| | Vertical plane | change of plane | Multiple plane |
| Direction | ⦿ | ○ | ○ |
| Challenge Indicator 4: Stability of step | | | |
| | Fixed | Step is stable but connector is movable | Unstable step (rope, chain, etc.) |
| Stability of step | ⦿ | ○ | ○ |
| Challenge Indicator 5: Height | | | |
| | Less than 3' | 3' to 5' | More than 5' |
| Height | ⦿ | ○ | ○ |

| Sliding component 1: Challenge Indicator 1: Direction | | | |
|---|---|---|---|
| | Straight | Curve (one direction) | Curvy (more than one direction) |
| Direction | ○ | ○ | ◉ |
| Challenge Indicator 2: Enclosure | | | |
| | Enclosed | Partially enclosed | No enclosure |
| Enclosure | ○ | ◉ | ○ |
| Challenge Indicator 3: Height | | | |
| | Less than 3' | 3' to 5'6" | more than 5'6" |
| Height | ○ | ○ | ◉ |

FIG. 4

| Crawling component 2: Challenge Indicator 1: Inclination | | | |
|---|---|---|---|
| | No inclination ○ | Slight inclination ≤ 8° ○ | Steep inclination > 8° ⊙ |
| Inclination | | | |
| Challenge Indicator 2: Direction | | | |
| | Straight ○ | 1 turn, far end partially visible ○ | 2 or more turns, far end not visible ⊙ |
| Direction | | | |
| Challenge Indicator 3: Enclosure | | | |
| | Open ○ | Perforated ○ | Solid with small openings ⊙ |
| Enclosure | | | |

FIG. 5

Balancing component 1:
Challenge Indicator 1: Distance between steps

| | Continuous surface | Steps at regular distance | Steps at irregular distance |
|---|---|---|---|
| Distance between steps | ○ | ⊙ | ○ |

Challenge Indicator 2: Inclination

| | No/light inclination | Moderate inclination | Steep |
|---|---|---|---|
| Inclination | ⊙ | ○ | ○ |

Challenge Indicator 3: Stability of step

| | Fixed | Stepping surface moves/ handrails fixed | Stepping surface and handrail both move |
|---|---|---|---|
| Stability of step | ○ | ○ | ⊙ |

Challenge Indicator 4: Grip/grasp

| | Full support | Limited, one hand or alternate hands | No hand support |
|---|---|---|---|
| Grip | ⊙ | ○ | ○ |

Challenge Indicator 5: Height

| | Less than 3' | 3' to 5' | More than 5' |
|---|---|---|---|
| Height | ⊙ | ○ | ○ |

FIG. 7

| Upper Body Exercises/Brachiating component 1: Challenge Indicator 1: Translocation | | | |
|---|---|---|---|
| | No translocation | Short distance translocation: 3-5 steps | Long distance translocation: more than 5 steps |
| Translocation | ⊙ | ○ | ○ |

| Challenge Indicator 2: Stability of grip/grasp | | | |
|---|---|---|---|
| | Fixed | Grasping hold connector pivots | Rotating |
| Stability of grip/grasp | ⊙ | ○ | ○ |

| Challenge Indicator 3: Body weight support | | | |
|---|---|---|---|
| | Sitting/standing | No ground contact | Arms lift body and/or translocate (brachiating) |
| Body weight support | ○ | ⊙ | ○ |

| Challenge Indicator 4: Height | | | |
|---|---|---|---|
| | Less then 3' | 3' to 5' | More than 5' |
| Height | ○ | ○ | ⊙ |

FIG. 9

2. Social/ Cognitive Domain

Which of the following play opportunities are present in the equipment?

See examples given below for the convenience of coding

1. Dramatic Play: play houses, steering wheels, telescopes, and panels with windows.
2. Manipulative Play: panels with small items that can be turned/moved, and weaving panels.
3. Creating Music and Art: drums, xylophones, and music panels, painting, drawing.
4. Communication: talking tubes.
5. Small Group Play: cozy areas, nooks.
6. Natural Elements: Intentionally designed opportunities to play with natural elements like sand, water, dirt, sun, wind, or rocks.
7. Games: tic tack toes, electronic games, table games.
8. Learning Science, Math, Social Studies, Literacy: panels showing numbers, letters, words, plants, birds, informational panels and/or hand-on panels with movable parts.

1. Dramatic Play
2. Manipulative Play
3. Music And Art
4. Communication
5. Small Group Play
6. Natural Elements
7. Games
8. Learning Math & Science

| | How many components? | How many different types? | How many social (side-by-side) play opportunities? | Total |
|---|---|---|---|---|
| 1. Dramatic Play | 1 | 1 | 0 | 2 |
| 2. Manipulative Play | 2 | 2 | 2 | 6 |
| 4. Communication | 1 | 1 | 0 | 2 |
| 7. Games | 1 | 1 | 1 | 3 |

FIG. 11

| Social-Cognitive Domain | Opportunity | Quantity | Variety | Number of components intended for multiple users |
|---|---|---|---|---|
| Dramatic | ✓ | 2 | 2 | 1 |
| Manipulative | ✓ | 1 | 1 | 0 |
| Music & Art | ✓ | 1 | 1 | 1 |
| Communication | ✓ | 1 | 1 | 0 |
| Small Group Play | ✓ | 1 | 1 | 1 |
| Natural Elements | | | | |
| Games | ✓ | 1 | 1 | 1 |
| Learning | | | | |
| Total | 6/8 | 7 | 7 | 4 |
| Distribution of Opportunities | | Social Opportunities | | |
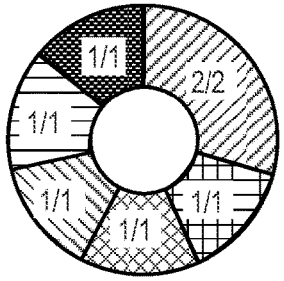
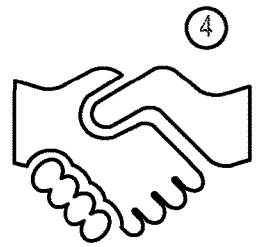
④
FIG. 12

| Site Attributes | 0 | 1 | 2 | | Site Attributes | 0 | 1 | 2 |
|---|---|---|---|---|---|---|---|---|
| Inclusion | | | | | Shade | ⊘ | | |
| Primary Pathways | ⊘ | ⊘ | | | Seating | | | ⊘ |
| Topography | ⊘ | | | | Signage | | ⊘ | |
| Planting Pockets | ⊘ | | | | Surfacing | ⊘ | | |
| Trees & Shrubs | | ⊘ | | | Amenities | | | ⊘ |
| Site Enclosure | ⊘ | | | | Cultural/Historical Themes | ⊘ | | |
| Total | | | | | | | | 7/24 |

Overview — 30%

FIG. 13

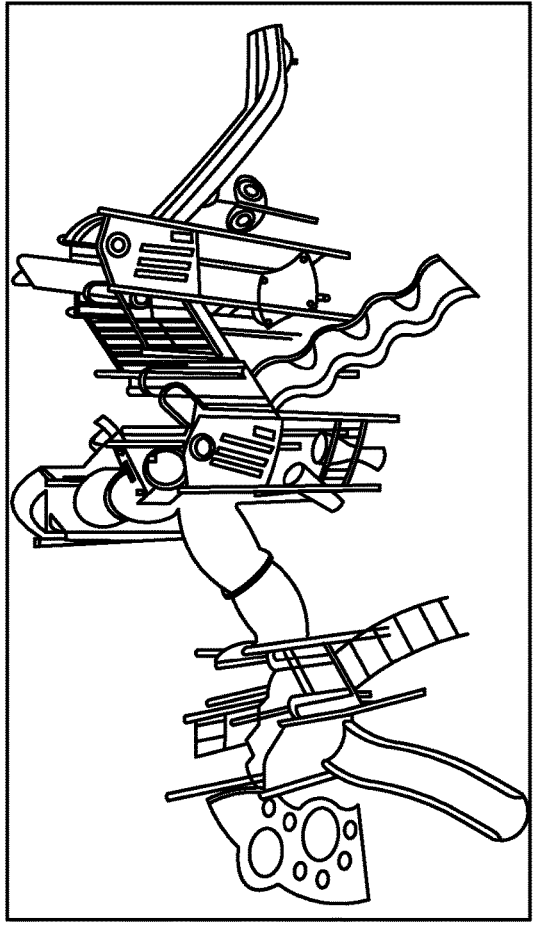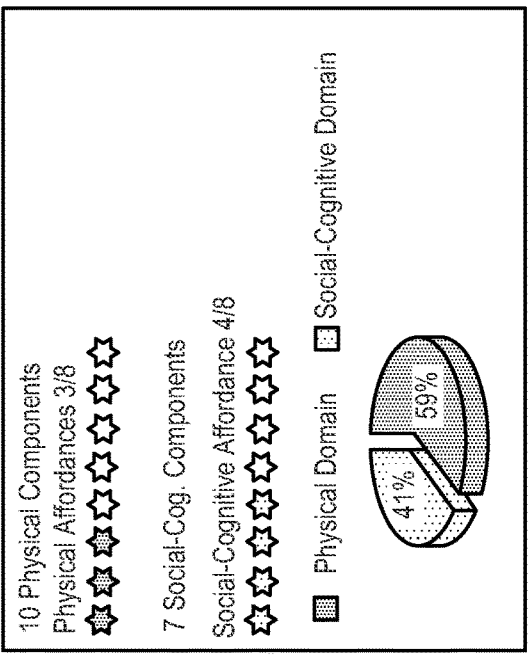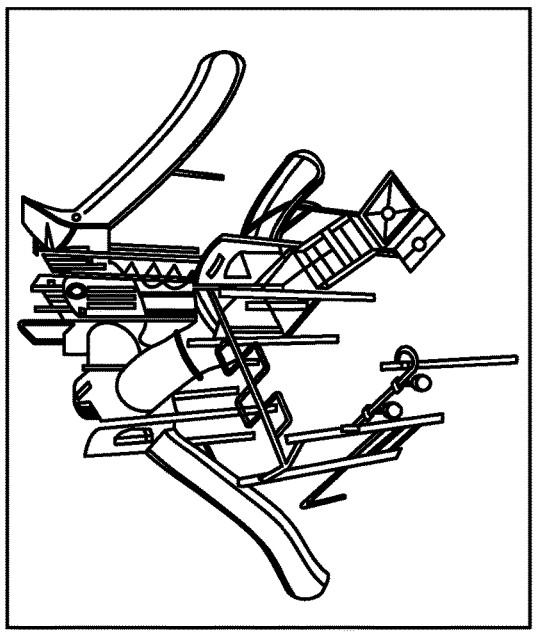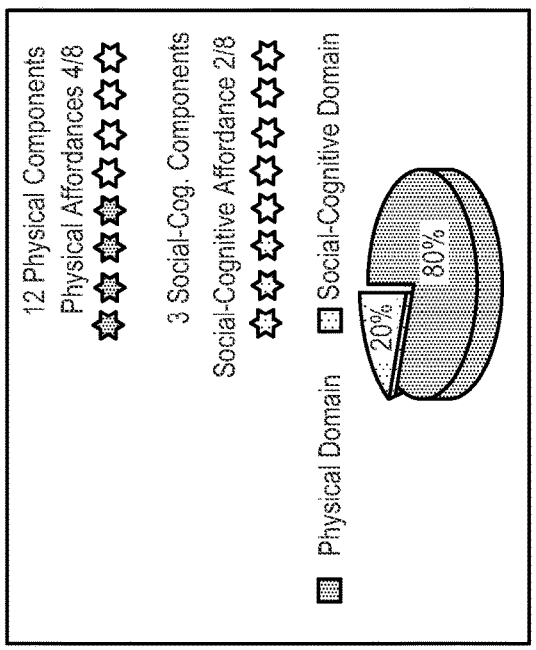
FIG. 17

METHOD AND SYSTEM FOR ASSESSING PLAY VALUE OF A PLAYGROUND

The present application is a continuation of U.S. Non-provisional patent application Ser. No. 15/400,723, filed on Jan. 6, 2017, which claims priority to U.S. Provisional Patent Application No. 62/275,942, filed on Jan. 7, 3026, the contents of which are hereby incorporated by reference in their entireties.

BACKGROUND OF THE INVENTION

The present disclosure is directed to a tool, e.g. a method and system, for assessing the play value of a playground, play facility, play environment, or other play equipment, and more particularly to a tool for assessing the play value of a playground by taking into account any combination of: the number of different types of play opportunities provided by the playground, the number of unique elements (or play affordances) in the playground, the number of different challenge levels provided by the elements (or play affordances) within each type of play opportunity, and/or the number of elements (or play affordances) that are designed for social play.

"Play value" is a term that has conventionally been used to describe the number of play affordances in a particular playground design. Accordingly, the play value of a playground has conventionally been calculated by simply considering the number of play affordances in the playground. For instance, a playground having three swings, two slides, and one see-saw would be considered to have six play affordances, and thus a play value of six. This number, however, tells little of the actual ability of the playground to keep children entertained.

The present disclosure is directed to a tool that more accurately evaluates the actual play value of a playground based on a number of different factors that are have now been scientifically validated to be primary influencers of the ability of a playground to entertain children. The methods and systems of the present disclosure may therefore alter the manner in which playgrounds are designed, improved, and replaced.

SUMMARY OF THE INVENTION

It is an object of at least one embodiment of the present disclosure to provide a method for rating the play value of an existing or prospective playground by (a) identifying types of play opportunities that are present in the playground; (b) for each identified type of play opportunity: (i) identifying a total number of components in the playground within the identified type of play opportunity, (ii) identifying a number of unique components in the playground within the identified type of play opportunity, and (iii) identifying a challenge level of each unique component in the playground within the identified type of play opportunity; and (c) assigning an overall play value rating of the playground based at least in part on the total number of components, the number of unique components, and the challenge level of each unique component within each identified type of play opportunity. In some embodiments, assigning an overall play value rating of the playground may comprise (i) combining at least the total number of components, the number of unique components, and the challenge level of each unique component within each identified type of play opportunity to determine a play value score for each identified type of play opportunity; and (ii) combining the play value scores for each identified type of play opportunity to assign the overall play value rating of the playground.

In some embodiments, the challenge level of each unique component within a selected/identified category/type may be compared against one another to determine the number of unique challenge levels that are provided by the components within the selected/identified category. For instance, the unique challenge levels may be selected from beginner, intermediate, and advanced. In some embodiments, the play value score for a selected play opportunity type/category may be determined by combining at least the total number of components in the playground from within the selected/identified category/type, the number of unique components in the playground from within the selected/identified category/type, and the number of unique challenge levels met by the components from within the selected/identified category/type.

In some embodiments, identifying the challenge level of each unique component from within a selected/identified category/type may comprise: (a) providing one or more challenge indicator factors; (b) within each factor, providing a plurality of component descriptors, each of the component descriptors being assigned a value; (c) causing one to select a component descriptor from within each factor; and (d) combining the values of the selected component descriptors in order to assess an overall challenge level of the component. Each of the challenge indicator factors may be weighted based on its respective impact on the overall challenge level of the component.

In some embodiments, the method may further comprise identifying the number of components that promote social play and utilizing the number of components that promote social play to assign the overall play value rating of the playground. For instance, the play value score for a selected/identified play opportunity type/category may be determined by combining at least the total number of components in the playground from within the selected/identified category/type, the number of unique components in the playground from within the selected/identified category/type, the number of unique challenge levels met by the components from within the selected/identified category/type, and the number of components in the playground from within the selected/identified category/type that promote social play.

It is another object of at least one embodiment of the present disclosure to provide a method for rating the play value of an existing or prospective playground, comprising performing by at least one processor: (a) providing play opportunity categories and prompting one on a display to select with a user input device one or more categories of play opportunity that are present in a playground; (b) for each selected play opportunity category: (i) prompting one on a display to identify with a user input device the total number of components in the playground within the selected category, (ii) prompting one on a display to identify with a user input device the number of unique components in the playground within the selected category, and (iii) prompting one on a display to identify with a user input device the challenge level of each unique component in the playground within the selected category; and (c) assigning an overall play value rating of the playground based at least in part on the total number of components, the number of unique components, and the challenge levels within each selected play opportunity category. In some embodiments, assigning an overall play value rating of the playground may comprise (i) combining at least the total number of components, the number of unique components, and the challenge level of each unique component within each identified type of play opportunity to determine a play value score for each identified type of play opportunity; and (ii) combining the play value scores for each identified type of play opportunity to assign the overall play value rating of the playground.

It is another object of at least one embodiment of the present disclosure to provide a system for rating the play value of an existing or prospective playground, the system comprising: a display, a user input device, and a processing unit configured to execute a software application that performs the following: (a) on a display prompt a user to input with a user input device the play opportunity categories that are present in a playground, and receive the user response; (b) for each selected category: (i) on the display prompt a user to identify with the user input device the total number of components in the playground within the selected category, and receive the corresponding user input, (ii) on the display prompt a user to identify with the user input device the number of unique components in the playground within the selected category, and receive the corresponding user input, and (iii) on the display prompt a user to identify with the user input device the challenge level of each unique component in the playground within the selected category, and receive the corresponding user input; (c) assign an overall play value rating of the playground based at least in part on the total number of components, the number of unique components, and the challenge levels within each selected play opportunity category; and (d) display the overall play value rating on the display.

In some embodiments, the system may be configured to identify the challenge level of each unique component from within a selected/identified category/type by: (i) prompting a user on a display to input with a user input device particular information about the component and (ii) processing that information to assign an overall challenge level of the component. In some embodiments, for example, identifying the challenge level of each unique component from within a selected/identified category/type may comprise: (a) displaying one or more challenge indicator factors; (b) within each factor, displaying a plurality of component descriptors, each of the component descriptors being assigned a value; (c) prompting a user on the display to select a component descriptor from within each factor with the user input device; and (d) the processor combining the values of the selected component descriptors in order to assess an overall challenge level of the component. Each of the challenge indicator factors may be weighted based on its respective impact on the overall challenge level of the component, information which may be stored in a memory of the system.

In some embodiments, the system may also prompt a user on the display to identify the number of components that promote social play with the user input device and process that information in assigning the overall play rating of the playground. In some embodiments, the system may also prompt a user on a display to identify one or more cognitive play opportunities with the user input device and process that information in assigning the overall play rating of the playground. In some embodiments, the system may also prompt a user on a display to identify one or more playground site attributes with the user input device and process that information in assigning the overall play rating of the playground.

It is another object of at least one embodiment of the present disclosure to provide a method and system for comparing the play values of multiple existing and/or prospective playgrounds by calculating a play rating for at least two of the playgrounds, such as using any of the embodiments disclosed herein, and comparing the play ratings of the at least two playgrounds.

It is another object of at least one embodiment of the present disclosure to provide a method and system for determining how to modify a playground in order to efficiently increase the play value of the playground. This method and system may comprise determining one or more modifications to effectively increase the overall play value of the playground based at least in part on the total number of components, the number of unique components, and the challenge levels for each identified type of play opportunity, such as using any of the embodiments disclosed herein. For instance, a processor may run a number of iterations in which various components (and their attributes) stored within the memory are added to the playground to determine which additional components would provide the greatest increase in play rating. In some embodiments, the processor may also run a number of iterations in which existing components of the playground are replaced by new components to determine which alterations would provide the greatest increase in play rating. The system may then display the one or more suggested additional components and/or alterations. Once a user has selected one or more of the suggestions, the processor may then run new iterations to determine which additional components and/or alterations would provide the greatest increase in play rating (i.e. the processor may update the suggestions based on user selections).

It is another object of at least one embodiment of the present disclosure to provide a method and system for determining a challenge level of a playground. For instance, rather than (or in addition to) assign the play value of a playground, the system may be configured to assign a playground with a challenge level, with the challenge level being based at least in part on the total number of components in the playground that fall within each challenge level, for example beginner, intermediate, and advanced. The challenge level of each component may be determined as described in any of the embodiments disclosed herein.

It is another object of at least one embodiment of the present disclosure to provide a method and system for comparing the challenge levels of multiple existing and/or prospective playgrounds by calculating a challenge level for at least two of the playgrounds, such as using any of the embodiments disclosed herein, and comparing the challenge levels of the at least two playgrounds.

It is another object of at least one embodiment of the present disclosure to provide a method and system for determining how to modify a playground in order to efficiently increase or decrease the challenge level of the playground. This method and system may comprise determining one or more modifications to effectively increase or decrease the challenge level of the playground based at least in part on the total number of components, the number of unique components, and the challenge levels for each identified type of play opportunity, such as using any of the embodiments disclosed herein. For instance, a processor may run a number of iterations in which various components (and their attributes) stored within the memory are added to the playground to determine which additional components would provide the greatest increase or decrease in challenge level. In some embodiments, the processor may also run a number of iterations in which existing components of the playground are replaced by new components to determine which alterations would provide the greatest increase or decrease in challenge level. The system may then display the one or more suggested additional components and/or alterations. Once a user has selected one or more of the suggestions, the processor may then run new iterations to determine which additional components and/or alterations would provide the greatest increase or decrease in challenge level (i.e. the processor may update the suggested modifications based on user selections).

In some embodiments, the system may also account for the effect of each additional component on the play value of the playground, such that one or more suggested modifications are selected to provide an increase or decrease in challenge level (whichever is desirable, e.g. selected by a user) and a relatively high increase in play value. For instance, the processor may be configured to run iterations of both a challenge level assessment and a play value assessment and to suggest additional components and/or alterations based on a combination of the two results.

It is another object of at least one embodiment of the present disclosure to provide a software program for designing a playground having a high play value, a desired challenge level, or both. For instance, the software application could be configured to assess a play value as described in any of the embodiments disclosed herein and to indicate the play value and/or challenge level of a virtual playground in real time as various components are added to and/or removed from the virtual playground. For instance, each playground component could be associated with a component identifier (e.g. stored in a memory), information identifying the type of play opportunity provided by the component (e.g. stored in a memory), and information identifying the challenge level provided by the component (e.g. stored in a memory or determined through an assessment performed by the software based on certain attributes of the component, such as is described herein). This information could be used by a processor executing the software application to provide an updated play value assessment and/or an updated challenge level assessment as a user adds and/or removes components (i.e. designs) a playground with the software.

BRIEF DESCRIPTION OF THE DRAWINGS

A clear conception of the advantages and features of one or more embodiments will become more readily apparent by reference to the exemplary, and therefore non-limiting, embodiments illustrated in the drawings:

Figure 1:
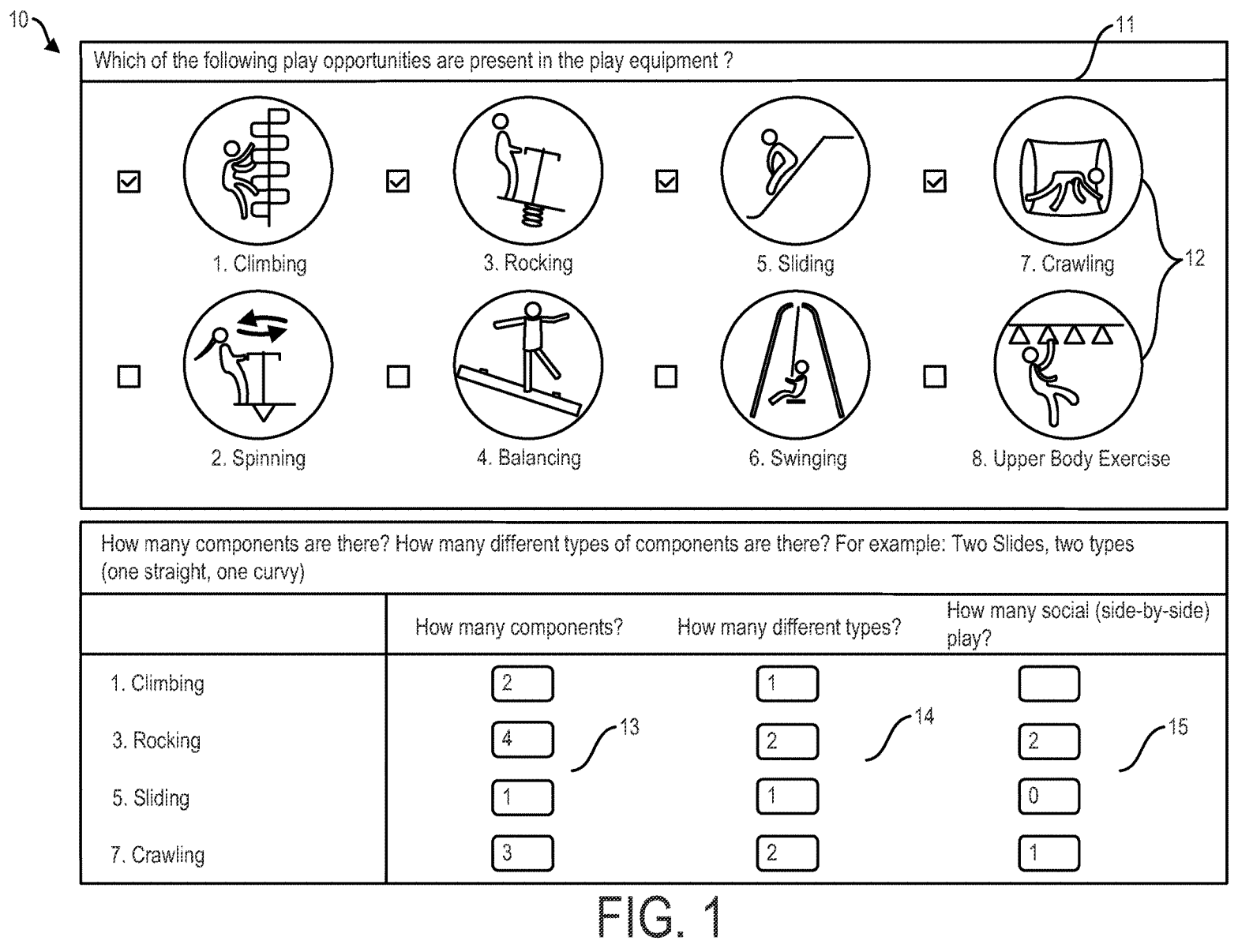

FIG. 1 is an illustration of an embodiment of a system configured to cause a user to identify one or more categories of physical play opportunities present in a playground, a total number of components in the playground within each identified category, a number of unique components in the playground within each identified category, and the number of social/side-by-side components in the playground within each identified category.

FIG. 2 is an illustration of an embodiment of a system configured to cause a user to identify the challenge level of a climbing component using challenge indicator factors.

Figure 3:
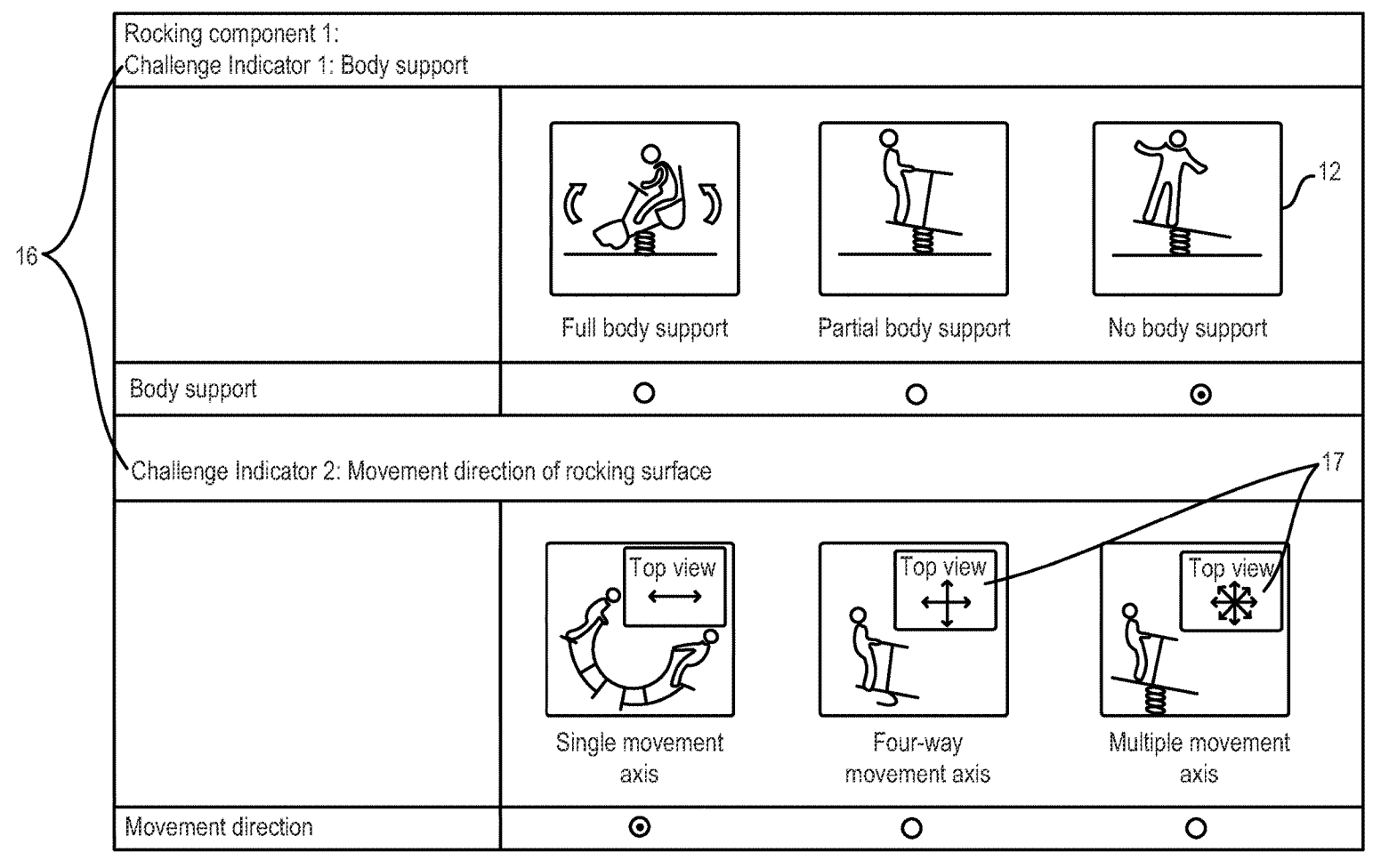

FIG. 3 is an illustration of an embodiment of a system configured to cause a user to identify the challenge level of a rocking component using challenge indicator factors.

FIG. 4 is an illustration of an embodiment of a system configured to cause a user to identify the challenge level of a sliding component using challenge indicator factors.

FIG. 5 is an illustration of an embodiment of a system configured to cause a user to identify the challenge level of a crawling component using challenge indicator factors.

FIG. 7 is an illustration of an embodiment of a system configured to cause a user to identify the challenge level of a balancing component using challenge indicator factors.

FIG. 9 is an illustration of an embodiment of a system configured to cause a user to identify the challenge level of an upper body exercise/brachiating component using challenge indicator factors.

FIG. 11 is an illustration of an embodiment of a system configured to cause a user to identify one or more categories of cognitive play opportunities present in a playground, a total number of components in the playground within each identified category, a number of unique components in the playground within each identified category, and the number of social/side-by-side components in the playground within each identified category.

FIG. 12 is an illustration of an embodiment of a play value scoresheet for cognitive play opportunities within a playground such as may be produced by the methods and systems of the present disclosure.

FIG. 13 is an illustration of an embodiment of a play value scoresheet for playground site attributes such as may be produced by the methods and systems of the present disclosure.

FIG. 17 is an illustration of an embodiment of playground design software that is configured to utilize play value analysis to assist a user in the design process by displaying comparative play value scoresheets for a plurality of prospective playground designs.

DETAILED DESCRIPTION OF THE INVENTION

Figure 6:
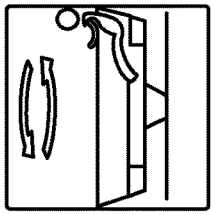
FIG. 6 is an illustration of an embodiment of a system configured to cause a user to identify the challenge level of a spinning component using challenge indicator factors.
Figure 8:
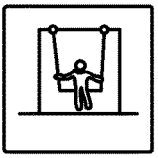
FIG. 8 is an illustration of an embodiment of a system configured to cause a user to identify the challenge level of a swinging component using challenge indicator factors.

Embodiments of the present disclosure are directed to tools, e.g. methods and systems, that accurately evaluates the actual play value of a playground based on a number of different factors that are have now been scientifically validated to be primary influencers of the ability of a playground to entertain children, i.e. the variety of play affordances, the variety of challenge levels provided by the play affordances, and/or the number of social play opportunities provided by the playground, in addition to the number of play affordances in the playground. Therefore, where the term "play value" is used henceforth, it refers to the actual play value of a playground as determined by an embodiment of the assessment tool described herein, and not merely to the number of play affordances in a particular playground.

The method and system of the present disclosure may alter the manner in which playgrounds are designed, improved, and replaced. For example, in some embodiments, the present disclosure may be directed to a method or system for improving a prospective or existing playground, such as by suggesting one or more play affordances that could be incorporated into a playground in order to efficiently increase the play value and/or in order to increase or decrease the challenge level of a playground (such as to increase entertainment for older or younger children). In other embodiments, the present disclosure may be directed to a method or system for comparing the play values of a plurality (i.e. two or more) of playgrounds, for instance in order to assist a private or public entity, such as a school district, a parks and recreation department, or the like in prioritizing which of a plurality of playgrounds to install, modify, replace, or remove. In other embodiments, the present disclosure may be directed to a method or system for developing new playgrounds or new elements (e.g. structures) for playgrounds. Each of these methods and systems is described in more detail below, with reference being made to the attached drawings.

Method for Assessing or Rating the Play Value of a Playground

Embodiments of the present disclosure are directed to a method for assessing the play value of an existing or prospective playground.

The method may comprise identifying, or causing a user to identify, the categories of physical play opportunities that are present in a playground. The categories of physical play opportunities provided by a playground should generally be understood as referring to the different types of activities that are promoted by the elements of a playground. Common types or categories of physical play activities include, for example: climbing, spinning, rocking, balancing, sliding, swinging, crawling, and upper body. This list is not meant to be exclusive and additional types of physical play opportunities are also contemplated by the present disclosure. Moreover, as playgrounds continue to develop, it is contemplated that additional types of physical play opportunities may be discovered and incorporated into the methods and systems described herein. A user may be prompted to enter this information or each component may be associated with an identifier so that the types of play opportunities in an existing playground or playground design may be automatically determined, such as by processor executing a software application. In this manner, the method may take into account the variety of different types of play activities provided by a playground.

Figure 15:
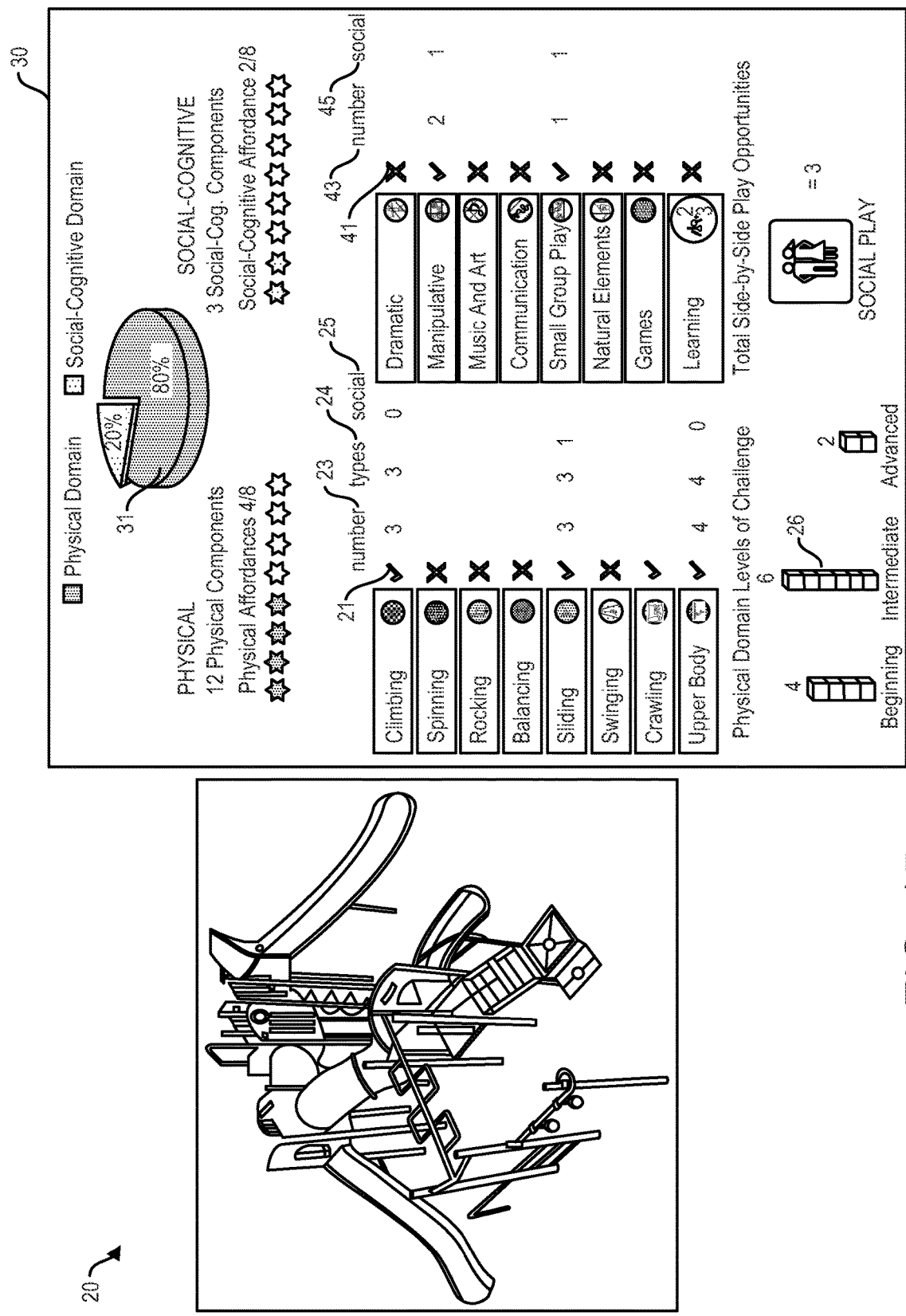
FIG. 15 is an illustration of an embodiment of playground design software that is configured to utilize play value analysis to assist a user in the design process by displaying a play value scoresheet for a prospective playground design.

For instance, an embodiment of a system 10 that is configured for a user to enter the categories of physical play opportunities that are present in a playground is shown in FIG. 1. In this embodiment, a user is prompted to select one or more categories of physical play activities 11, with each category of physical play activity being represented by an icon 12. An embodiment of a system 20 that is configured such that the categories of physical play opportunities that are present in a playground are automatically determined is shown in FIG. 15. In this embodiment, each physical play component of a playground design is associated with an identifier of the category of physical play opportunity to which it belongs. For instance, a catalog of identifiers may be stored in a system memory. Accordingly, as each component is entered into the system (such as through user input, the use of playground design software, or software that is configured to identify a component by analysis of a photograph of an existing playground structure or component), the system may retrieve the identifier of the component for incorporation into a play value analysis and/or display 21 in a play value scorecard 30.

The method may also comprise identifying, or causing a user to identify, the total number of elements in a playground within each selected category of play opportunity. For instance, a user might identify a playground as having two climbing elements, three sliding elements, two swinging elements, and three upper body exercise elements. A user may be prompted to enter this information or each component may be associated with an identifier so that the number of components within a category of play opportunity may be automatically determined, such as by a processor executing a software application. In this manner, the method may take into account the quantity of elements within each category of play opportunity.

For instance, an embodiment of a system 10 that is configured for a user to enter the number of components within each identified category of physical play opportunity present in a playground is shown in FIG. 1. In this embodiment, a user is prompted to enter the number of components within each selected category of physical play activities 13. An embodiment of a system 20 that is configured such that the number of components within each identified category of physical play opportunity present in a playground is automatically identified is shown in FIG. 15. In this embodiment, each physical play component of a playground design is associated with an identifier of the category of physical play opportunity to which it belongs. For instance, a catalog of identifiers may be stored in a system memory. Accordingly, as each component is entered into the system (such as through user input, the use of playground design software, or software that is configured to identify a component by analysis of a photograph of an existing playground structure or component), the system may retrieve the identifier of the component and integrate it into a log containing the number of components falling within the category (e.g. add one to the proper log) for incorporation into a play value analysis and/or display 23 in a play value scorecard 30.

The method may also comprise identifying, or causing a user to identify, the number of unique elements in a playground within each selected type or category of play opportunity. For instance, within the above-described two climbing elements, three sliding elements, two swinging elements, and three upper body exercise elements, the playground may contain two unique climbing elements (meaning that the two climbing elements are substantially different from one another), two unique sliding elements (meaning that two of the three sliding elements are the same or substantially the same), one unique swinging element (meaning that both of the swinging elements are the same or substantially the same), and three unique upper body exercise elements (meaning that all three of the upper body exercise elements are substantially different from one another). In this manner, the method may take into account the variety of elements within each type or category of play opportunity.

In some embodiments, a user may be prompted to enter this information. For instance, a user may simply be prompted to enter the number of unique components within the selected category of play opportunity. Alternatively, a user may be asked to provide information about the components that will allow for the uniqueness of the components to be determined, such as by a processor executing a software application. In other embodiments, each component may be associated with an identifier so that the number of unique components in an existing playground or playground design may be automatically determined, such as by a processor executing a software application.

For instance, an embodiment of a system 10 that is configured for a user to enter the number of unique components within each selected category of physical play opportunity in a playground is shown in FIG. 1. In this embodiment, a user is prompted to enter the number of unique components within each selected category of physical play activities 14. An embodiment of a system 20 that is configured such that the number of unique components within each category of physical play opportunities in a playground is automatically determined is shown in FIG. 15. In this embodiment, each unique physical play component of a playground design is associated with a unique identifier. For instance, a catalog of identifiers may be stored in a system memory. Accordingly, as each component is entered into the system (such as through user input, the use of playground design software, or software that is configured to identify a component by analysis of a photograph of an existing playground structure or component), the system may retrieve the unique identifier of the component, compare it against the identifiers of the other components within the category, and if applicable (i.e. if it differs from the identifiers of the other components within the category) integrate it into a log containing the number of unique components falling within the category (e.g. add one to the proper log) for incorporation into a play value analysis and/or display 24 in a play value scorecard 30.

The method may also comprise identifying, or causing a user to identify, the challenge level of each unique element in the playground. In some embodiments, a user may simply be prompted to select a challenge level for each unique component from within an array of well-understood levels, e.g. beginner, intermediate, and advanced levels, or age levels of the children that utilize the component.

In some embodiments, a user may be caused to provide information about each component (or each unique component) that will allow for the challenge level of the component to be determined, such as by a processor executing a software application. In some embodiments, for example, the step of identifying the challenge level of a particular element will vary depending on which category of play opportunity that element falls within. This is because, depending on the type of play opportunity, a number of different factors may contribute to the challenge level of a component. For example, the challenge level of a slide may depend on factors such as height, incline or steepness, shape (e.g. twisted, straight, etc.), the presence of enclosures, and/or the like.

In some embodiments, therefore, the method provides a manner for identifying, or causing a user to identify, the challenge level of a component from within a selected category by providing one or more challenge indicator factors and, within each factor, providing a plurality of component descriptors, each of which is assigned a value. In this way, a user will be caused to select a component descriptor from within each challenge indicator factor. Then, the values associated with each of the component descriptors may be combined to produce an overall challenge level of the element. For example, one may be asked whether a particular slide element is tall, short, or medium height, with tall being assigned a value of three, short being assigned a value of one, and medium being assigned a value of two. Similarly, one may be asked whether that particular slide element has a low incline, a medium incline, or a high incline, with low incline being assigned a value of one, medium incline being assigned a value of two, and high incline being assigned a value of three. Instead of the component descriptors, a user may be asked a number of questions about a particular component, the responses to which will provide the necessary information relating to each challenge indicator factors. For example, a user may be asked to enter the height of a particular slide element, and the response may be converted to an appropriate value. Once each of the challenge indicator factors has been provided with a value based on the user input, the values associated with each of the challenge indicator factors may be analyzed and/or combined, such as through addition, in order to provide an overall component challenge score. The overall component challenge score may be compared against a scale, such as may be stored in a system memory, to produce the challenge level of the component.

In some embodiments, certain challenge indicator factors may have more of an impact on the overall challenge level of a component than others. Accordingly, in some embodiments, one or more of the challenge indicator factors may be weighted based on its respective impact on the overall challenge level of the component. Using the above example, if the incline of a slide were considered to be more important than the height, the values associated with the incline challenge factor may be given more weight than the value associated with the height challenge factor. For example, the values associated with the user selections from within the incline challenge factor may be weighted more, such as at one and one half times or two times the weight of the user selection from within the height challenge factor. In some embodiments, this weighing of factors may be used in order to provide a more accurate identification of the overall challenge factor of a particular element.

For instance, an embodiment of a system 10 that is configured for a user to select a component descriptor that relates to a challenge indicator factor for a particular type of physical play opportunity is shown in FIGS. 2 through 9. In these embodiments, a user is provided with one or more challenge indicator factors 16 that are associated with and relevant to the challenge level of a component within the particular category of physical play activity. Within each factor, a user is provided with a plurality of component descriptors 17. In some embodiments, each of the component descriptors may be represented with an icon 12. A user is prompted to select the component descriptor 17 that most accurately describes the component under analysis. Once a user has selected a component descriptor 17 from within each challenge indicator factor 16, the values associated with each component descriptor are processed to produce a challenge level of the component under analysis. This process may then begin anew for another identified unique playground component.

In some embodiments, especially such as where the method is being used to design a new playground or to modify an existing playground, a particular element may already be associated with a predetermined challenge level. These same challenge indicator factors may generally be considered in order to identify the predetermined challenge level that has been associated with the particular element. Indeed, in some embodiments, the above-described process may be performed by a software programmer or the like in order to associate a playground element with a specific predetermined challenge level.

An embodiment of a system 20 that is configured such that the challenge level of components within each category of physical play opportunities in a playground are automatically determined is shown in FIG. 15. In this embodiment, each physical play component of a playground design may be associated with a predetermined challenge level identifier. For instance, a catalog of identifiers may be stored in a system memory. Accordingly, as each component is entered into the system (such as through user input, the use of playground design software, or software that is configured to identify a component by analysis of a photograph of an existing playground structure or component), the system may retrieve the challenge level identifier of the component and integrate it into a log containing the number of components within each challenge level (e.g. add one to the proper log) for incorporation into a play value analysis and/or display 26 in a play value scorecard 30. In another embodiment, the system may be configured to determine the challenge level of a component based on the physical characteristics of the component, which in some embodiments may be modified by a user. For instance, in some embodiments, the processor may compare a set of physical characteristics for a selected component against a scale, such as may be stored in the system memory, to determine a challenge level for the component.

In some embodiments the challenge levels of the components within a particular category of play opportunity are compared against one another to determine the number of unique challenge levels that are provided by the components within the selected category. For instance, each of the components within a category of play opportunity may be identified or determined to provide an easy challenge level, an intermediate challenge level, or a difficult challenge level. Once each of the components within the play opportunity category is assigned one of these challenge levels, the variety of challenge levels within the play opportunity category may be calculated. For example, where a playground has three unique elements within the slide category, and each of those three elements has a different challenge level (e.g. one is easy, one is intermediate, and one is difficult), then the category may be scored as having elements that provide three (3) different challenge levels. On the other hand, if two of the three elements are of the same challenge level, than the category may be scored as having elements that provide two (2) different challenge levels. In this way, the variety of challenge levels provided by the elements within a particular type of play opportunity may be identified.

The method may also comprise identifying, or causing a user to identify, the number of elements in the playground that promote social play. Elements that promote social play are those physical components that are configured for multiple children to perform an activity simultaneously and interactively. For example, elements such as slides, monkey bars, climbing nets, etc. may be placed side-by-side or otherwise accommodate side-by-side play in order to promote children to interact with one another while performing the physical activity. Because of the additional interactive aspect provided by these elements, they are thought to provide an enhanced benefit to the overall play value of a playground. A user may be prompted to enter this information or each component may be associated with an identifier so that the number of components that promote social play may be automatically determined, such as by a processor executing a software application.

For instance, an embodiment of a system 10 that is configured for a user to enter the number of components in a playground that promote social play is shown in FIG. 1. In this embodiment, a user is prompted to enter the number of components that promote social play within each selected category of physical play activities 15. An embodiment of a system 20 that is configured such that the number of components in a playground that promote social play is automatically identified is shown in FIG. 15. In this embodiment, each physical play component of a playground design is associated with an identifier that indicates whether or not the component promotes social play. For instance, a catalog of identifiers may be stored in a system memory. Accordingly, as each component is entered into the system (such as through user input, the use of playground design software, or software that is configured to identify a component by analysis of a photograph of an existing playground structure or component), the system may retrieve the identifier of the component and if applicable integrate it into a log containing the number of components that promote social play (e.g. add one to the proper log) for incorporation into a play value analysis and/or display 25 in a play value scorecard 30.

Once a desired combination of the above identifications has been made, the method comprises processing the identifications to calculate an overall play value of a playground. For example, in some embodiments, the method comprises using at least the number of components, the number of unique components, and the challenge levels within each selected category of physical play opportunity to calculate an overall play value rating of the playground.

In some embodiments, the method comprises determining a play value score for each category of physical play opportunity. For instance, in some embodiments, the method may comprise combining at least the number of components, the number of unique components, and the challenge levels within each selected category of play opportunity to determine a play value score for each selected category of physical play opportunity.

For instance, in some embodiments the play value score for a category of physical play opportunity may be determined by adding together at least the total number of components in the playground from within the selected category, the number of unique components in the playground from within the selected category, and the number of unique challenge levels met by the components from within the selected category. In some embodiments, the play value score for a category of physical play opportunity may be determined by adding together the total number of components in the playground from within the selected category, the number of unique components in the playground from within the selected category, the number of unique challenge levels met by the components from within the selected category, and the number of components from within the selected category that promote social play.

Figure 10:
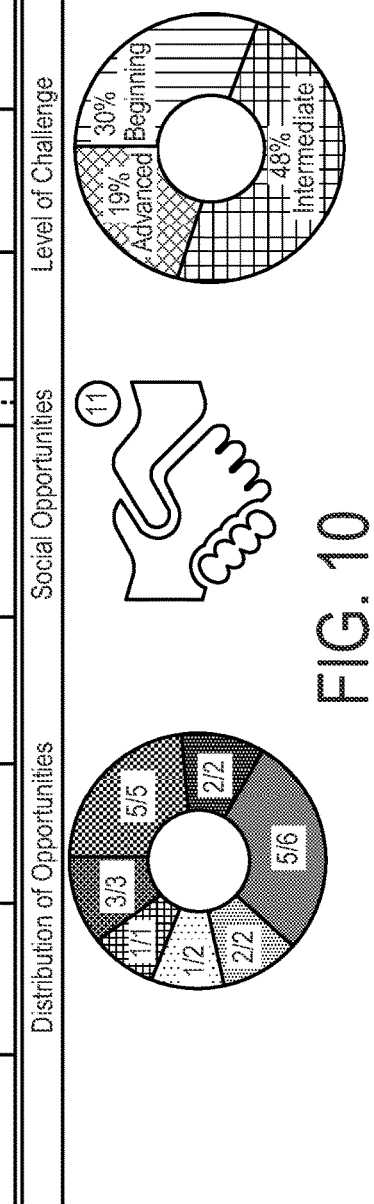
FIG. 10 is an illustration of an embodiment of a play value scoresheet for physical play opportunities within a playground such as may be produced by the methods and systems of the present disclosure.

The play value scores for the various categories of physical play opportunity may be displayed to a user so as to provide guidance as to which type or types of play opportunities may be lacking in the playground and/or which type or types of play opportunities may best be added to a playground design in order to most efficiently increase the overall play value of the playground. For instance, in some embodiments, the play value score for each of the various types of physical play opportunities may be displayed in a graphical format. An example of such a scoresheet is shown in FIG. 10.

The play value scores for each category of physical play opportunity may also be combined in order to calculate the overall play value rating of the playground. In some embodiments, for example, the play value scores for each category of physical play opportunity may be added together to determine the overall play value rating of the playground.

As an example, consider a playground that contains elements within only two categories of play: climbing and sliding. The playground contains three sliding elements and two climbing elements.

A score for the sliding category may be obtained as follows: Two out of the three sliding elements are determined to be the same or substantially the same. Accordingly, the sliding category contains two unique elements. It is further determined that one of the unique sliding elements provides a first challenge level while the other of the unique sliding elements provides a second challenge level (the second challenge level differing from the first challenge level). Accordingly, the sliding category contains two different challenge levels. The score for the sliding category may thus be calculated by adding the total number of elements within the category (3), the number of unique elements within the category (2), and the number of challenge levels provided by the elements within the category (2) in order to obtain a score of seven (7) for the sliding category.

Similarly, a score for the climbing category may be obtained as follows: The two climbing elements are determined to be different. Accordingly, the climbing category contains two unique elements. It is further determined that the two unique climbing elements are of the same challenge level. Accordingly, the climbing category contains a single challenge level. The score for the climbing category may thus be calculated by adding the total number of elements within the category (2), the number of unique elements within the category (2), and the number of challenge levels provided by the elements within the category (1) in order to obtain a score of five (5) for the climbing category.

The overall play value of the playground may then be determined by adding the play value scores of the two categories of play opportunity, e.g. seven (7) for the sliding category and five (5) from the climbing category to obtain an overall play value score of twelve (12).

The overall play value of the playground may also take into account the number of elements that promote social play. For example, the scores of each play opportunity type may be adjusted based on the number of elements within that category that are designed to promote social play. Accordingly, where the two climbing elements in the above example are side by side (or where one of the climbing elements accommodates social play by multiple children), the play value score for the climbing category may be adjusted from five up to six (6). Thus, addition of the play value scores of the two categories of play opportunity, e.g. seven for the sliding category and six from the climbing category will result in an overall play value score of thirteen (13). Alternatively, the values associated with elements that promote social play may be combined with the calculated play value of the playground. For instance, rather than identifying the number of components within each play opportunity category that promote social play, a user may identify the total number of elements within the playground that promote social play and that number may be combined with the value reached by combining the play value scores of the various categories illustrated above.

Other manners of determining the overall play value rating of a playground based on the above-described information are also contemplated. For example, in some embodiments, certain information may be provided with different weights, e.g., the variety of challenge levels provided by the playground components may be provided with a multiplier in order to enhance their contribution to the overall play rating. In some embodiments, the overall play value of the playground may take into greater account the variety of different types of play opportunities provided by the playground elements. For example, the number of different types or categories of play opportunities present in a playground may be combined, such as by addition, with the value reached by combining the play value scores of each of the categories illustrated above.

In other embodiments, the information may be combined in a different manner altogether (e.g. involving more than addition of the play value scores for each category). For instance, the overall play value score may also be calculated without the intermediate step of calculating play value scores for each play opportunity category. The information may also be combined by methods that involve more than addition. Rather, a variety of methods for combining the information in order to determine the overall play value rating of a playground are contemplated. The exact manner in which the information is combined in order to determine the overall play value rating of the playground is not limited by those examples presented herein, so long as the information is combined in a manner that results in a play value rating that accurately reflects the actual ability of a playground to provide a positive entertainment experience.

In some embodiments, the method may also account for cognitive, i.e. non-physical, play opportunities within an existing or prospective playground. A well-rounded and diverse playground will often also contain cognitive play opportunities in addition to physical play opportunities. Cognitive play opportunities are those that, rather than physical play, relate to social and cognitive play such as dramatic play, manipulative play, music and art, communication, small group play, natural elements, games, and learning. In many instances, it may be desirable to have a particular distribution between physical play affordances and cognitive play affordances. Accordingly, in some embodiments, the play value of a playground will be based, at least in part, on the distribution between the play value provided by the physical components and the play value provided by the cognitive components.

In some embodiments, for example, the method may comprise identifying, or causing a user to identify, the categories of cognitive play opportunities that are present in the playground. Common types or categories of cognitive play opportunities include, for example, dramatic play, manipulative play, music and art, communication, small group play, natural elements, games, and learning. This list is not meant to be exclusive and additional types of cognitive play opportunities are also contemplated by the present disclosure. Moreover, as playgrounds continue to develop, it is contemplated that additional types of cognitive play opportunities may be discovered and incorporated into the method and system described herein. A user may be prompted to enter this information or each component may be associated with an identifier so that the categories of cognitive play opportunity in the playground may be automatically determined, such as by a processor executing a software application. In this manner, the method may take into account the variety of different types of play activities provided by a playground.

For instance, an embodiment of a system 10 that is configured for a user to enter the categories of cognitive play opportunities that are present in a playground is shown in FIG. 11. In this embodiment, a user is prompted to select one or more categories of cognitive play activities 41, with each category of cognitive play activity being represented by an icon 12 (and examples of each being provided for convenience). An embodiment of a system 20 that is configured such that the categories of cognitive play opportunities that are present in a playground are automatically determined is shown in FIG. 15. In this embodiment, each cognitive play component of a playground design is associated with an identifier of the category of cognitive play opportunity to which it belongs. For instance, a catalog of identifiers may be stored in a system memory. Accordingly, as each component is entered into the system (such as through user input, the use of playground design software, or software that is configured to identify a component by analysis of a photograph of an existing playground structure or component), the system may retrieve the identifier of the component for incorporation into a play value analysis and/or display 41 in a play value scorecard 30.

The method may also comprise identifying, or causing a user to identify, the total number of elements in a playground within each selected category of cognitive play opportunity. For instance, a user might identify a playground as having two dramatic play elements, three manipulative play elements, two music elements, and three small group play elements. A user may be prompted to enter this information or each component may be associated with an identifier so that the number of components within a category of cognitive play opportunity may be automatically determined, such as by a processor executing a software application. In this manner, the method may take into account the quantity of elements within each type or category of cognitive play opportunity.

For instance, an embodiment of a system 10 that is configured for a user to enter the number of components within each identified category of cognitive play opportunity present in a playground is shown in FIG. 11. In this embodiment, a user is prompted to enter the number of components within each selected category of cognitive play activities 43. An embodiment of a system 20 that is configured such that the number of components within each identified category of cognitive play opportunity present in a playground is automatically identified is shown in FIG. 15. In this embodiment, each cognitive play component of a playground design is associated with an identifier of the category of cognitive play opportunity to which it belongs. For instance, a catalog of identifiers may be stored in a system memory. Accordingly, as each component is entered into the system (such as through user input, the use of playground design software, or software that is configured to identify a component by analysis of a photograph of an existing playground structure or component), the system may retrieve the identifier of the component and integrate it into a log containing the number of components falling within the category (e.g. add one to the proper log) for incorporation into a play value analysis and/or display 43 in a play value scorecard 30.

The method may also comprise identifying, or causing a user to identify, the number of unique elements in a playground within each selected type or category of cognitive play opportunity. For instance, within the above-described two dramatic play elements, three manipulative play elements, two music elements, and three small group play elements, the playground may contain two unique dramatic play elements (meaning that the two dramatic play elements are substantially different from one another), two unique manipulative play elements (meaning that two of the three manipulative play elements are the same or substantially same), one unique music element (meaning that both of the music elements are the same or substantially the same), and three unique small group play elements (meaning that all three of the small group play elements are substantially different from one another). A user may be prompted to enter this information, or information about the components from which the number of unique components can be determined, such as by a processor executing a software application. In other embodiments, each component may be associated with an identifier so that the number of unique components within a category of play opportunity may be automatically determined, such as by a processor executing a software application. In this manner, the method may take into account the variety of elements within each type or category of cognitive play opportunity.

For instance, an embodiment of a system 10 that is configured for a user to enter the number of unique components within each selected category of cognitive play opportunity in a playground is shown in FIG. 11. In this embodiment, a user is prompted to enter the number of unique components within each selected category of cognitive play activities 44. An embodiment of a system 20 that is configured such that the number of unique components within each category of cognitive play opportunities in a playground is automatically determined is shown in FIG. 15. In this embodiment, each unique cognitive play component of a playground design is associated with a unique identifier. For instance, a catalog of identifiers may be stored in a system memory. Accordingly, as each component is entered into the system (such as through user input, the use of playground design software, or software that is configured to identify a component by analysis of a photograph of an existing playground structure or component), the system may retrieve the unique identifier of the component, compare it against the identifiers of the other components within the category, and if applicable (i.e. if it differs from the identifiers of the other components within the category) integrate it into a log containing the number of unique components falling within the category (e.g. add one to the proper log) for incorporation into a play value analysis and/or display in a play value scorecard 30.

The method may also comprise identifying, or causing a user to identify, the number of cognitive elements in the playground that promote social play. Elements that promote social play are those cognitive components that are configured for multiple children to perform an activity simultaneously and interactively. A user may be prompted to enter this information or each component may be associated with an identifier so that the number of components that promote social play may be automatically determined, such as by a processor executing a software application.

For instance, an embodiment of a system 10 that is configured for a user to enter the number of cognitive components in a playground that promote social play is shown in FIG. 11. In this embodiment, a user is prompted to enter the number of components that promote social play within each selected category of cognitive play activities 45. An embodiment of a system 20 that is configured such that the number of components in a playground that promote social play is automatically identified is shown in FIG. 15. In this embodiment, each cognitive play component of a playground design is associated with an identifier that indicates whether or not the component promotes social play. For instance, a catalog of identifiers may be stored in a system memory. Accordingly, as each component is entered into the system (such as through user input, the use of playground design software, or software that is configured to identify a component by analysis of a photograph of an existing playground structure or component), the system may retrieve the identifier of the component and if applicable integrate it into a log containing the number of cognitive components that promote social play (e.g. add one to the proper log) for incorporation into a play value analysis and/or display 45 in a play value scorecard 30.

As with the physical play opportunities, in some embodiments, the method may comprise determining a play value score for each category of cognitive play opportunity. For instance, in some embodiments, the method may comprise combining at least the number of components and the number of unique components. In some embodiments, the play value score for a category of cognitive play opportunity may be determined by adding together the total number of components in the playground from within the selected category, the number of unique components in the playground from within the selected category, and the number of components from within the selected category that promote social play.

The play value scores for the various categories of cognitive play opportunity may be displayed to a user so as to provide guidance as to which type or types of play opportunities may be lacking in the playground and/or which type or types of play opportunities may best be added to a playground design in order to most efficiently increase the overall play value of the playground. For instance, in some embodiments, the play value score for each of the various types of cognitive play opportunities may be displayed in a graphical format. An example of such a scoresheet is shown in FIG. 12.

As with the physical play elements, once a desired combination of the above identifications has been made, the method may comprise using the identifications to calculate an overall play value of a playground. For example, in some embodiments, the method comprises using at least the number of components and the number of unique components within each selected type of cognitive play opportunity to calculate an overall play value rating of the playground. In some embodiments, the method comprises determining a play value score for each type of cognitive play opportunity. For instance, in some embodiments, the method may comprise combining at least the number of components and the number of unique components within each selected type of cognitive play opportunity to determine a play value score for each selected type of cognitive play opportunity.

To determine an overall play value of a playground, the play value scores for the one or more types of physical play opportunities and the play value scores for the one or more types of cognitive play opportunities may be combined. For example, the play value scores for each may be added together to obtain an overall play value score. Other methods of combining the values are also contemplated. For example, in some embodiments, it may be desirable to provide the play value scores of cognitive play opportunities with a lesser weight than the play value scores of physical play opportunities. In other embodiments, it may be desirable to provide the play value scores of cognitive play opportunities with a greater weight than the play value scores of physical play opportunities. As described above, a variety of methods for combining the information in order to determine the overall play value rating of a playground are contemplated. The exact manner in which the information is combined in order to determine the overall play value rating of the playground is not limited by those examples presented herein, so long as the information is combined in a manner that results in a play value rating that accurately reflects the actual ability of a playground to provide a positive entertainment experience.

Figure 14:
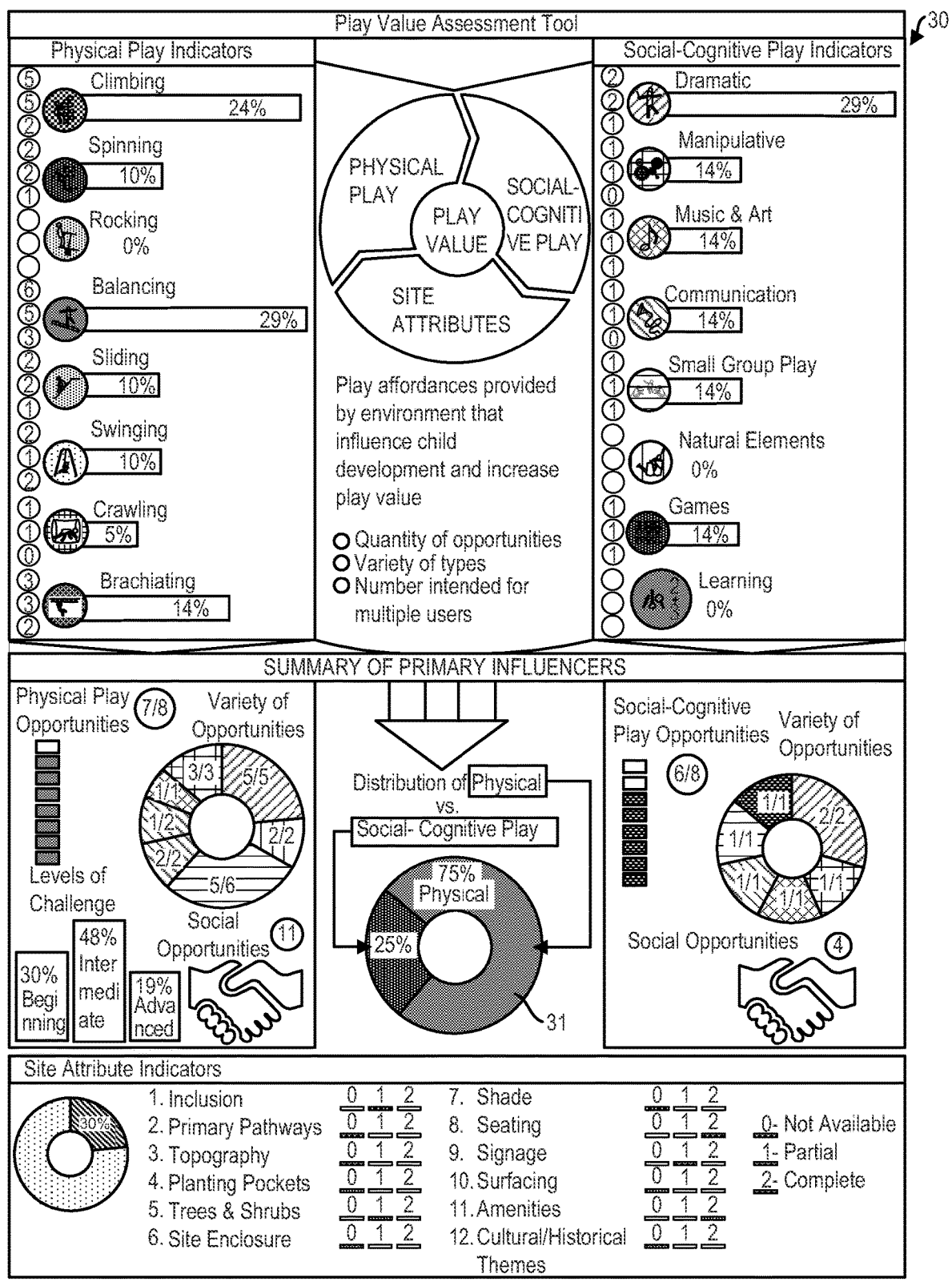
FIG. 14 is an illustration of an embodiment of a play value scoresheet for a playground such as may be produced by the methods and systems of the present disclosure.

The method may also comprise determining a distribution between the total number of physical play components and the total number of cognitive play elements. Alternatively, the method may also comprise determining a distribution between the play value score of the physical play components and the play value score of the cognitive play components. Either or both of these distributions may be shown graphically, for example. An example of a scoresheet 30 comprising such a distribution 31 is shown in FIG. 14 and FIG. 15. The distributions may provide a user with information from which to assess the playground and/or determine what types of improvements may be most beneficial, such as in order to obtain a playground having a desired balance.

In some embodiments, the method may also account for beneficial site attributes, or environmental elements, of an existing or prospective playground that may improve, affect, or encourage play or generally promote visitation to the playground and/or enjoyment of the playground. Environmental elements that may improve, affect, or encourage play or generally promote visitation to a playground and/or enjoyment of a playground may include playground location amenities, typically beyond the playground structure itself, that improve the overall ability to use the playground, promote safety of the playground, provide other conveniences for the playground users or care providers of the users, and improve the look and feel of the environment surrounding the playground. Beneficial environmental elements may include, but are not limited to: site enclosures, accessibility, pathways, seating opportunities, vegetation (including plantings, trees, and shrubs), shade, general signage, interpretative or educational signs, the presence of a safety surface or surfaces, bike racks, fitness stations, general topography, and other amenities (including shelter, picnic table, trash cans). Because of the improved ability to use the playground, the promotion of safety, the conveniences provided and the improved look and feel of the environment of the playground due to these types of environmental elements, they are thought to promote use and provide an enhanced benefit to the overall play value of a playground.

In some embodiments, for example, each of a plurality of site attribute categories may be graded on a scale from zero to two, with 0 meaning generally that the site attribute is not available, 1 meaning generally that the site attribute is partially available, and 2 meaning that the site attribute is completely available. The play value scores for the various categories of site attributes may be displayed to a user so as to provide guidance as to which type or types of site attributes may be lacking in the playground and/or which type or types of site attributes may best be added to a playground design in order to most efficiently increase the overall play value of the playground. For instance, in some embodiments, the rating for each of the various types of site attributes may be displayed in a graphical format. An example of such a scoresheet is shown in FIG. 13.

The presence of certain site attributes may be combined with the play value assessment relating to the physical and/or cognitive play opportunities to be accounted for in assigning an overall play value rating. For example, the site attribute scores may be added together with the physical play score and the cognitive play score to obtain an overall play value score. Other methods of combining the values are also contemplated. For example, in some embodiments, it may be desirable to provide the site attribute scores with a lesser weight than the play value scores of physical and/or cognitive play opportunities. As described above, a variety of methods for combining the information in order to determine the overall play value rating of a playground are contemplated. The exact manner in which the information is combined in order to determine the overall play value rating of the playground is not limited by those examples presented herein, so long as the information is combined in a manner that results in a play value rating that accurately reflects the actual ability of a playground to provide a positive entertainment experience.

Method for Comparing the Play Values of Multiple Playgrounds

Embodiments of the present invention are directed to methods for comparing the play values of multiple playgrounds. This may be useful in order to determine which of a plurality of playgrounds is in need of an upgrade, a replacement, or the like. For example, it is often the case that a number of playgrounds are owned or operated by a single entity. Yet the decision as to which of the multiple playgrounds to remove, replace, or upgrade may often be based on arbitrary factors. The method disclosed herein may be used to quantify the relative values of the multiple playgrounds in order to determine where and how value may best be maximized across the collection of playgrounds.

The method generally comprises assigning a play value rating to each of the multiple playgrounds using the method described herein and then comparing the play value ratings of the multiple playgrounds. The comparison may be done in any number of manners. For example, the comparison may comprise a ranking based on overall play value scores. The comparison may also comprise a graphical representation illustrating the distribution of play values among the multiple playgrounds. It is further contemplated that the comparison may be specifically tailored to the wishes of a particular entity. For example, an entity might be interested in assessing the distribution of cognitive play opportunities between a plurality of playgrounds in order to determine where additional cognitive play opportunities may be best placed. Or an entity might be interested in assessing the distribution of challenge levels of a plurality of playgrounds in order to determine which playgrounds might benefit from being made more or less challenging. Accordingly the comparison may take any variety of forms. An example of a system display of a comparison between two playgrounds is shown in FIG. 17.

Method for Proposing Modifications

Embodiments of the present invention are directed to methods for determining how best to modify a playground in order to increase the play value of the playground. For instance, in some embodiments, the information about an existing playground or playground design may be analyzed in order to determine one or more modifications, such as new components, that would most effectively and efficiently increase the overall play value of a playground. In some embodiments, the information about an existing playground or playground design may be analyzed in order to determine how play value is distributed within a playground and how that distribution may be beneficially altered by revisions to the playground design. In some embodiments, a listing of potential new components that could be added to the existing playground or playground design may be stored in a memory. Each potential new component in the memory may be associated with one or more identifiers, as described herein.

A desired combination of information may be identified as described above. Once a desired combination of the above identifications has been made, the method comprises using the combination of information to determine one or more modifications that will effectively and efficiently increase the play value of a playground. For example, in some embodiments, the method comprises using at least the number of components, the number of unique components, and the challenge levels within each selected type of play opportunity within the existing playground or playground design to determine one or more additional components, such as from a list of components that may be stored in a memory, that could be added to a playground or playground design in order to efficiently increase the overall play value of the playground.

In some embodiments, the method comprises determining a play value score for each type of play opportunity. For instance, in some embodiments, the method may comprise combining at least the number of components, the number of unique components, and the challenge levels within each selected type of play opportunity to determine a play value score for each selected type of play opportunity. More particularly, in some embodiments the play value score for a play opportunity type may be determined by adding together at least the total number of components in the playground from within the selected category, the number of unique components in the playground from within the selected category, and the number of unique challenge levels met by the components from within the selected category. In some embodiments, the play value score for a play opportunity type may be determined by adding together the total number of components in the playground from within the selected category, the number of unique components in the playground from within the selected category, the number of unique challenge levels met by the components from within the selected category, and the number of components from within the selected category that promote social play.

In some embodiments, the information and/or the play value scores for the various types or categories of play opportunity may be compared so as to determine where additional new components would be most useful to increase the play value of the playground. For example, the information and/or play value scores for the various types or categories of play opportunity may be displayed to a user so as to provide guidance as to which type or types of play opportunities may be lacking in the playground and/or which type or types of play opportunities may best be added to a playground design in order to most efficiently increase the overall play value of the playground. For instance, in some embodiments, the information and/or play value score for each of the various types of play opportunities may be displayed in a graphical format.

In some embodiments, the information and/or the play value scores for the various types or categories of play opportunity may be processed so as to identify one or more new playground components whose addition to the existing playground or playground design would provide the greatest benefit to the play value of the playground. For instance, in some embodiments, an overall play value score of the playground may be assigned to the playground, as described elsewhere in this disclosure. Using this process, the effects of a plurality of potential new playground components on this overall play value score could be analyzed, such as through a processor, in order to determine one or more new playground components whose inclusion would have a significant (e.g. the greatest) positive effect, i.e. increase, on the overall play value of the playground.

For instance, a system memory may contain a catalog of potential new playground components and a processor may determine the play value increase (or in some instances decrease) that would be obtained by adding each of the potential new playground components to a playground (or by replacing an existing component with one of the potential new playground components). By comparing the play value increases for each modification, the system could thus determine one or more potential new playground components that would provide the greatest increases to the play value of the playground. The system could display one or more of the potential new playground components that would provide the greatest increases to the play value of the playground. A user could then select one or more of the suggested new playground components. Once a user selected one or more of the suggested new playground components, the system could run a new iteration of the play value analysis to develop a new selection of suggested modifications.

In some embodiments, additional factors, such as the costs of the potential new component(s), the space requirements of the potential new component(s), and the like may also be taken into account in obtaining one or more suggested modifications. For instance, in some embodiments, the list of potential new playground components may be limited based on certain other restrictions. In obtaining the one or more suggested modifications, the system may also take into account other factors, such as the costs and/or spacial requirements of the potential new components, in performing a more complex analysis. Based on this analysis, the system may provide multiple suggested modifications that together provide an efficient and significant increase in the play value of the playground while limiting the costs and spacial requirements of the new components or while staying within particular cost and/or spacial restraints. Or the system may be configured to provide a set of suggested modifications which together provide an efficient and significant increase in the play value of the playground while remaining within certain user-imposed conditions (e.g. below a certain cost, working within a certain space, etc).

Method for Assessing the Challenge Level of a Playground

Embodiments of the present disclosure are directed to method and systems for assessing the challenge level of a playground. The method may comprise assessing the challenge level of each component of a playground using the methods described herein. Once the challenge level of each component in the playground has been determined, the overall challenge level of the playground may be assigned based at least in part on the number of components in the playground that fall within each challenge level.

In addition to assessing the challenge level of a playground, the method may further comprise comparing the challenge levels of a plurality of playgrounds. The method may also further comprise determining one or more modifications to increase the play value of the playground. Alternatively, the method may further comprise determining one or more modifications to increase or decrease the challenge level of the playground. The method may also further comprising determining one or more modifications that would serve to both (a) increase or decrease the challenge level of the playground to a desired extent and (b) increase the overall play value of the playground (such as by increasing the diversity of components, play opportunity types, or the like).

Method of Designing Playground Using Playground Design Software

Figure 16:
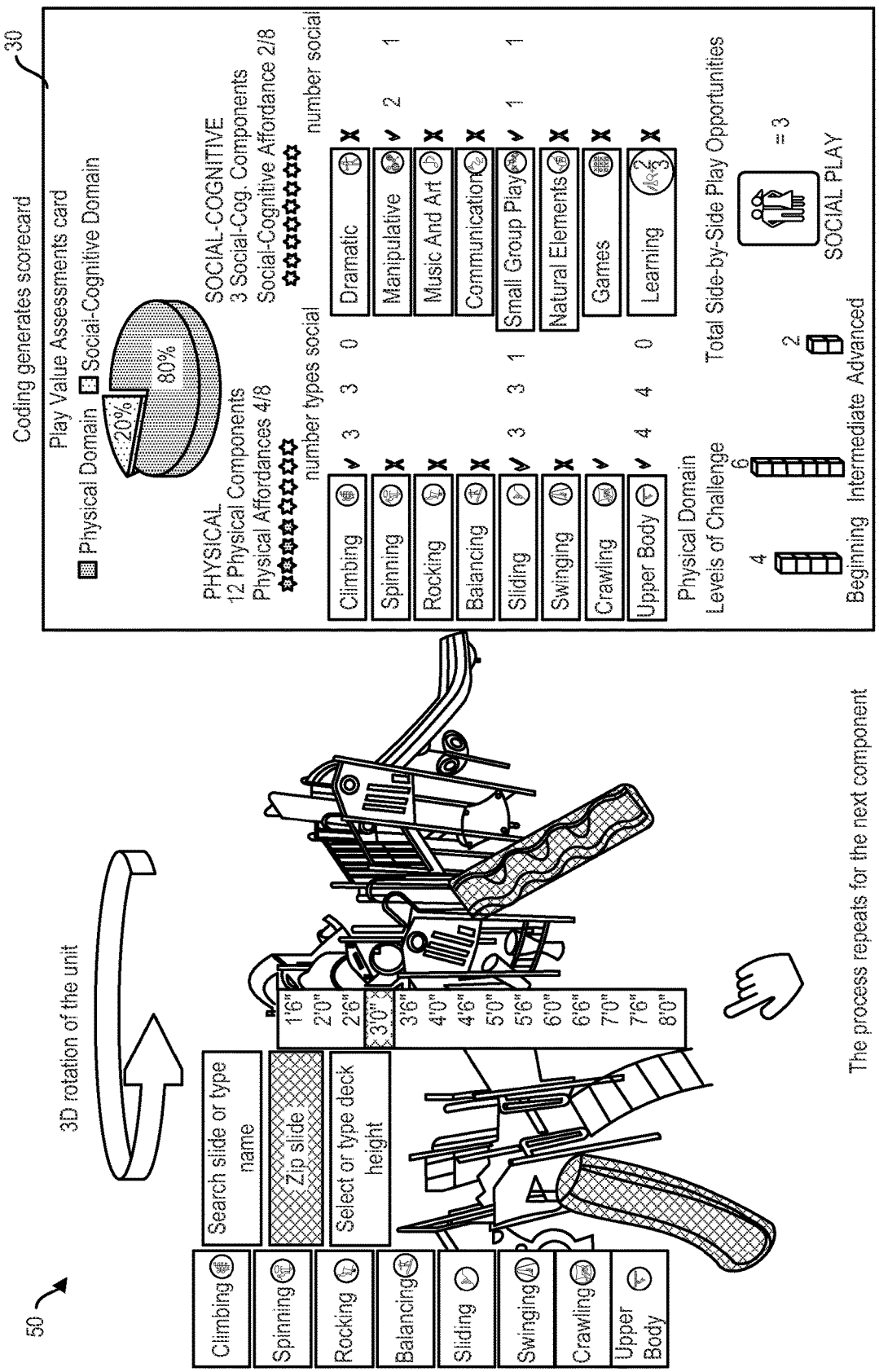
FIG. 16 is an illustration of an embodiment of playground design software that is configured to utilize play value analysis to assist a user in the design process by displaying a play value scoresheet that is updated as components are added to or removed from a prospective playground design.

Embodiments of the present disclosure are also directed to a method of designing a playground by incorporating a play value assessment tool as described herein into a playground design software. For instance, in some embodiments the playground design software may be configured to update a play value assessment of a playground design based on the addition of each component to the playground. Accordingly, the software may display the new play value assessment that results from the addition of each new component to the playground. An embodiment of playground design software 50 in which a scorecard 30 is updated as each component is added to, or removed from, the playground design is shown in FIG. 16.

In some embodiments, the software may display a new play value assessment that would result from the addition of a new component to the playground even prior to the user's addition of the component to the playground. For instance, in some embodiments, the play value assessment that would result from the addition of a variety of components may be displayed at any given time. For instance, next to each of the variety of components that may be added may be shown the new play value score that would result from an addition of each component. Alternatively, in some embodiments, a user may perform an initial selection of a potential component in order to display an updated play value assessment that would result from addition of the component to the playground. If desired, the user may then choose whether or not to proceed to add the component to the playground based at least in part on the updated play value assessment.

In some embodiments, the playground design software may be configured to suggest one or more new components for addition to the playground based on the effects that the one or more new components will have on the play value assessment of the playground, as has been described herein. For instance, if a playground design is above a desired overall challenge level, the software may suggest the addition of a component having a lower challenge level in order to decrease the overall challenge level to within a desired range. Or, for example, if a playground does not have any components within the rocking play category, the software may suggest the addition of a component within the rocking play category, as such an addition may be assessed by the system to provide the playground with the greatest increase in play value from among the available options.

In some embodiments, a user may be prompted to input one or more constraints and the playground design software may be configured to produce one or more playground designs that provide the highest play value within the identified constraints. For example, a user may be prompted to enter one or more spatial limitations, such as the square footage of a potential site, the dimensions of a potential site, the topography of a potential site, natural features such as trees within a potential site, and the like. A user may also be prompted to enter economic limitations, such as one or more "do not exceed" costs. In some embodiments, a user may be prompted to enter a wish-list of desired components (e.g. a user may desire a playground with at least 3 swings, at least 2 slides, etc.). A user may also be prompted to enter a desired age range or challenge level for the playground. In some embodiments, a user may be prompted to enter a combination of constraints, such as any combination of the above.

The software may then build a playground design having a maximum play value rating or a number of playground designs having the greatest play value ratings that fall within the entered constraints. For instance, a processor executing the playground design software could build a playground design by accessing the various components from a system memory (each of which may comprise a number of identifiers in addition to those relating to play value described above, such as cost, spatial requirements, etc.) and running iterative play value assessment analyses based on the potential inclusion of each component in order to determine one or more playground designs that most efficiently maximize the play value of the playground within the input constraints.

System

Embodiments of the present disclosure are also directed to a system, such as a computing system, that is configured to implement any of the methods described herein.

In various embodiments, the computing system may correspond with one or more PCs, and/or user communication devices, among other things. In various embodiments, the computing system may be a mobile device, for example, such as a smartphone or a tablet. The computing system may include a display, a processing unit, memory, user input device(s), and communications connection(s), among other things. Components of the computing system may be implemented in software, hardware, firmware, and/or the like. The various components of the computing system may be communicatively linked. Components of the computing system may be implemented separately and/or integrated in various forms. For example, the display and the user input device may be integrated as a touchscreen display.

The display may be any device capable of communicating visual information to a user. For example, a display may include a liquid crystal display, a light emitting diode display, and/or any suitable display. The display can be operable to display information from a software application, such as a playground design application, or any suitable information. In various embodiments, the display may display information provided by the processing unit, for example.

The processing unit (or processor) may be one or more central processing units, microprocessors, microcontrollers, and/or the like. The processing unit may be an integrated component, or may be distributed across various locations, for example. The processing unit may be capable of executing a software application, receiving input information from a user input device and/or communication connection(s), and generating an output displayable by a display, among other things. The processing unit may be capable of executing any of the method(s) and/or set(s) of instructions described and/or illustrated herein in accordance with the present invention, for example. In certain embodiments, the processing unit may communicate via communication connection(s) with servers to execute a playground rating application or a playground design application, for example.

The memory may be one or more computer-readable memories, for example, such as a hard disk, floppy disk, CD, CD-ROM, DVD, compact storage, flash memory, random access memory, read-only memory, electrically erasable and programmable read-only memory and/or any suitable memory. The memory may include databases, libraries, sets of information, or other storage accessed by and/or incorporated with the processing unit, for example. The memory may be able to store data temporarily or permanently, for example. The memory may be capable of storing data generated by the processing unit and/or instructions readable by the processing unit, among other things. In various embodiments, the memory stores information related to a playground rating application or playground design application, for example.

The user input device(s) may include any device(s) capable of communicating information from a user and/or at the direction of the user to the processing unit of the computing system, for example. The user input device(s) may include button(s), a touchscreen, near field communication (NFC) readers, radio frequency identification (RFID) readers, motion tracking, orientation detection, voice recognition, a mousing device, keyboard, camera, and/or any other device capable of receiving a user directive. In certain embodiments, one or more of the user input devices may be integrated into other components, such as the display, for example. As an example, user input device may include a touchscreen display.

Figure 18:
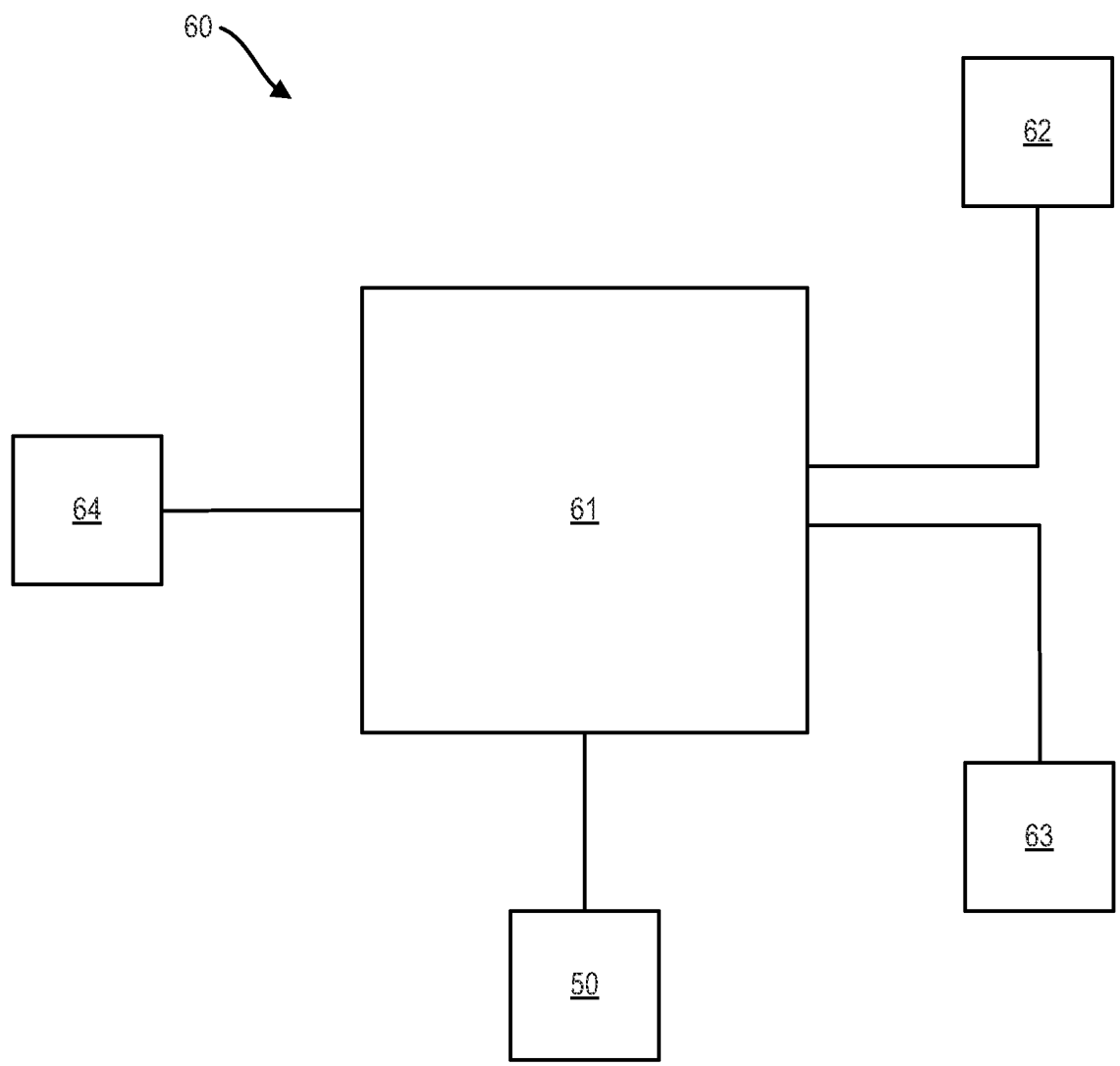
FIG. 18 is an illustration of an embodiment of a system configured to implement the methods of the present disclosure.

In various embodiments, the information provided by the user input device(s) to the processing unit may be processed by the processing unit to execute a playground play value analysis application or a playground design application, for example. As an example, button depressions, touchscreen selections, computer system orientation and/or movement detections, NFC tag information, RFID tag information, and/or voice commands, among other things, may be received from the user input device(s) and processed by the processing unit and/or servers to trigger a playground rating application or playground design application action or set of actions. An embodiment of a system 60 configured for executing playground design software 50 is illustrated in FIG. 18. The system comprises a processor 61, a display 62, a user interface 63, and a memory 64.

It should be understood that the use of the singular tense in describing any of the above devices is also meant to encompass a plurality of devices. For instance, reference to a processor is not limited to a single processor but would encompass one or more processors.

It can be seen that the described embodiments provide a unique and novel methods and systems that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method for designing or modifying an existing or prospective playground, the method comprising:

identifying, by at least one processor, one or more categories of physical play opportunities that are present in the existing or prospective playground;

identifying, by the at least one processor, for each category of physical play opportunity:

a total number of components in the existing or prospective playground within the category, a number of unique components in the existing or prospective playground within the category, and a challenge level of each unique component in the existing or prospective playground within the category;

determining and presenting at a display, by the at least one processor, a recommendation of one or more new components to be added to the existing or prospective playground based at least in part on an amount the new component increases the play value of the existing or prospective playground, wherein the play value is based at least in part on the total number of components within each category, the number of unique components within each category, and the challenge level of the components within each category;

receiving, by the at least one processor, a selection of at least one of the one or more new components to be added to the existing or prospective playground;

presenting in real-time at the display, by the at least one processor, (i) a three-dimensional rendering of the design of the existing or prospective playground modified to include the selected at least one of the one or more new components, (ii) the play value of the existing or prospective playground modified to include the selected at least one of the one or more new components, (iii) an increased amount in the play value of the existing or prospective playground modified to include the selected at least one of the one or more new components over the existing or prospective playground prior to the selection of the selected at least one of the one or more new components, or (iv) any combination of (i) through (iii).

2. The method of claim 1, wherein determining, by the at least one processor, the play value of the existing or prospective playground comprises:
  determining, by the at least one processor, a play value score for each identified category of physical play opportunity based on at least the total number of components, the number of unique components, and the challenge level of the components within each identified category; and
  combining, by the at least one processor, the play value score for each identified category of physical play opportunity to assign the play value to the existing or prospective playground.

3. The method of claim 2, wherein the challenge level of each unique component within the identified category of physical play opportunity are compared, by the at least one processor, to determine a number of unique challenge levels that are provided within the identified category.

4. The method of claim 3, wherein a play value for each identified category of physical play opportunity is determined, by the at least one processor, by combining at least the total number of components within the identified category, the number of unique components within the identified category, and the number of unique challenge levels provided within the identified category.

5. The method of claim 1, wherein the presenting at the display, by the at least one processor, one or more new components to be added to the existing or prospective playground is based at least in part on an effect each of the one or more new components will have on an overall challenge level of the existing or prospective playground, wherein the overall challenge level of the existing or prospective playground is based at least in part on the total number of components in the existing or prospective playground that fall within each challenge level.

6. The method of claim 1, wherein the challenge level of each unique component within a category of physical play opportunity is based at least in part on a value assigned to each of a plurality of component descriptors within each of one or more challenge indicator factors.

7. The method of claim 6, wherein the categories of physical play opportunities include a climbing category and wherein the one or more challenge indicator factors for the climbing category include one or more of the following: distance between risers, inclination, direction, stability of step, and height.

8. The method of claim 6, wherein the categories of physical play opportunities include a spinning category and wherein the one or more challenge indicator factors for the spinning category include one or both of the following: body support and inclination.

9. The method of claim 6, wherein the categories of physical play opportunities include a balancing category and wherein the one or more challenge indicator factors for the balancing category include one or more of the following: distance between steps, inclination, stability of step, grip/grasp, and height.

10. The method of claim 6, wherein the categories of physical play opportunities include a sliding category and wherein the one or more challenge indicator factors for the sliding category include one or more of the following: direction, enclosure, and height.

11. The method of claim 6, wherein the categories of physical play opportunities include a swinging category and wherein the one or more challenge indicator factors for the swinging category include one or more of the following: hanging point, seat, and swing types.

12. The method of claim 6, wherein the categories of physical play opportunities include a crawling category and wherein the one or more challenge indicator factors for the crawling category include one or more of the following: inclination, direction, and enclosure.

13. The method of claim 1, wherein the one or more categories of physical play opportunity comprise at least the following: climbing, spinning, rocking, balancing, sliding, swinging, crawling, and upper-body.

14. The method of claim 1, further comprising identifying, by the at least one processor, a number of components that promote social play,
  wherein assigning, by the at least one processor, a play value to the existing or prospective playground is based at least in part on the number of components that promote social play.

15. The method of claim 1, further comprising:
  identifying, by the at least one processor, one or more categories of cognitive play opportunities that are present in the existing or prospective playground;
  identifying, by the at least one processor, for each identified category of cognitive play opportunity:
    the total number of components in the existing or prospective playground within the category; and
    the number of unique components in the existing or prospective playground within the category; and
  wherein a play value of the existing or prospective playground is based at least in part on the total number of components and the number of unique components within each identified category of cognitive play opportunity.

16. The method of claim 15, further comprising determining, by the at least one processor, a distribution between a play value of the one or more categories of physical play opportunities and a play value of the one or more categories of cognitive play opportunities; and
  wherein the determining, by the at least one processor, one or more new components to be added to the existing or prospective playground is based at least in part on an effect each of the one or more new components will have on the distribution.

17. The method of claim 1, wherein the recommendation of the one or more new components is determined by the at least one processor:
  iteratively analyzing one or both of:
    the existing or prospective playground modified to include individual prospective components, or
    the existing or prospective playground modified to include various combinations of the prospective components; and
  selecting the one or more new components from one or both of the individual prospective components and the various combinations of the prospective components based at least in part on the amount the new component increases the play value of the existing or prospective playground.

18. A method for modifying an existing or prospective playground in order to efficiently increase its play value, comprising:

determining, by at least one processor, the play value of the existing or prospective playground by:
- identifying, by the at least one processor, one or more categories of physical play opportunities that are present in the existing or prospective playground;
- identifying, by the at least one processor, for each identified category of physical play opportunity:
  - a total number of components in the existing or prospective playground within the identified category,
  - a number of unique components in the existing or prospective playground within the identified category, and
  - a challenge level of each unique component in the existing or prospective playground within the identified category; and
- assigning, by the at least one processor, a play value to the existing or prospective playground based at least in part on the total number of components, the number of unique components, and the challenge level of the components within each identified category of physical play opportunity;

determining and presenting at a display, by the at least one processor, one or more modifications that result in an increase to the play value of the existing or prospective playground;

receiving, by the at least one processor, a selection of at least one of the one or more modifications;

presenting at a display, by the at least one processor, (i) a three-dimensional rendering of the design of the existing or prospective playground modified to include the selected at least one of the one or more new components, (ii) the play value of the existing or prospective playground modified to include the selected at least one of the one or more new components, (iii) an increased amount in the play value of the existing or prospective playground modified to include the selected at least one of the one or more new components over the existing or prospective playground prior to the selection of the selected at least one of the one or more new components, or (iv) any combination of (i) through (iii).

19. The method of claim 18, wherein determining, by the at least one processor, one or more modifications comprises:
- determining, by the at least one processor, the play value of the existing or prospective playground with an addition of each of a plurality of potential new playground components, and
- selecting, by the at least one processor, one or more potential new playground components that provide a largest increase to the play value of the existing or prospective playground.

20. The method of claim 19, wherein determining, by the at least one processor, the play value of the existing or prospective playground with an addition of each of a plurality of potential new playground components is performed iteratively.

* * * * *